United States Patent [19]

Nilssen

[11] Patent Number: 5,036,253
[45] Date of Patent: Jul. 30, 1991

[54] INVERTER POWER SUPPLY FOR INCANDESCENT LAMP

[76] Inventor: Ole K. Nilssen, Caesar Drive, Barrington, Ill. 60010

[21] Appl. No.: 461,653

[22] Filed: Jan. 8, 1990

Related U.S. Application Data

[63] Continuation of Ser. No. 667,691, Nov. 2, 1984, which is a continuation-in-part of Ser. No. 487,817, Apr. 22, 1983, Pat. No. 4,506,318.

[51] Int. Cl.[5] ............................................. H05B 41/00
[52] U.S. Cl. ................................. 315/151; 315/194; 315/224; 315/225; 315/362
[58] Field of Search ............... 315/151, 194, 224, 225, 315/291, 311, 362, DIG. 4

[56] References Cited

U.S. PATENT DOCUMENTS 3,609,515  9/1971  Babcock ..................... 315/194 X
4,277,728  7/1981  Stevens ...................... 315/194 X
4,924,150  5/1990  Nilssen ....................... 315/194 X Primary Examiner—Robert J. Pascal

[57] ABSTRACT

An inverter is powered by a magnitude-modulated DC supply voltage derived by rectification from an ordinary 120Volt/60Hz electric utility power line. The inverter powers a low voltage (12 Volt) incandescent lamp with a magnitude-modulated high frequency (30 kHz) voltage. The magnitude modulation on the high frequency voltage is proportional to the magnitude modulation on the DC supply voltage.

16 Claims, 2 Drawing Sheets

INVERTER POWER SUPPLY FOR INCANDESCENT LAMP

CONTINUATION-IN-PART

This application is a Continuation of application Ser. No. 06/667,691 filed 11/02/84; which is a Continuation-in-Part of application Ser. No. 06/487,817 filed 04/22/83.

BACKGROUND OF THE INVENTION

1. Field of Invention

The present invention relates to controllable power-line-operated inverter-type power supplies for incandesent lamps.

2. Description of Prior Art

Power-line-operated inverter-type power supplies are presently being used in a variety of applications. For instance, such power supplies are frequently being used for powering low-voltage incandescent lamps.

When using such inverter-type power supplies in connection with powering various loads, such as low-voltage incandescent lamps or microwave magnetrons, it is sometimes desirable to be able by way of electrically actuatable means to control the inverter output voltage, thereby providing for control of the power provided to the load. However, to provide cost-effectively for electrically actuatable means to effect control of the output of inverters is not as simple as it might initially appear.

Of course, to achieve such control, one might use an electrically actuatable variable-ratio transformer (Variac) between the power line and the input of the power supply. However, the cost and complexities associated with such an approach would be unacceptably high in most applications.

Or, one might consider the use of a Triac-type voltage control means mounted between the power line and the power supply. However, Triac-type voltage control means simply do not function properly with the kind of input characteristics normally associated with power-line-operated inverter-type power supplies.

Then, there is the possibility of using an inverter-type power supply with a special input circuit that would permit the use of a Triac-type control means; which input circuit would then have to make the inverter power-input-characteristics appear substantially like a resistive load. Even so, however, there is the cost and the electrical inefficiency of the Triac-type control to consider.

The present invention represents yet another solution; which other solution is novel, less costly and electrically more efficient than that of using a Triac-type control means between the power line and the inverter input.

SUMMARY OF THE INVENTION

Objects of Invention

An object of the present invention is that of providing a power-line-operated inverter-type power supply having electrically actuatable means to permit output voltage control.

This as well as other objects, features and advantages of the present invention will become apparent from the following description and claims.

Brief Description

In its preferred embodiment, subject invention is a power supply adapted to be powered from the regular 60 Hz power line voltage and to provide an output of relatively high-frequency (30 kHz) substantially square-wave voltage. This output voltage is provided by an inverter that is powered by way of the pulsed DC voltage derived from unfiltered full-wave rectification of the 60 Hz power line voltage. Thus, the high-frequency inverter output voltage is pulse-amplitude-modulated at a 120 Hz rate—in correspondence with the pulse-amplitude-modulations of the pulsed DC supply voltage.

The inverter is of a type that has to be triggered into oscillation. However, once triggered, it will continue to oscillate, but only for as long as the instantaneous magnitude of its pulsed DC supply voltage exceeds a certain threshold level.

Since the pulsed DC supply voltage falls to zero magnitude between each pulse, the inverter stops oscillating between each pulse. Thus, as long as output voltage is desired, the inverter has to be re-triggered after each pulse of the DC supply voltage.

Inverter triggering is accomplished by a Diac in combination with an RC integrating circuit; which means that—upon each application of a pulse of DC supply voltage—the inverter is triggered into oscillation only after the DC supply voltage has been present for some period of time; the length of this period being determined by the nature of the RC integrating circuit—much in the same way as phase-control is accomplished in an ordinary Triac-type incandescent lamp dimmer.

Connected with the RC integrating circuit is a control transistor, the effective impedance of which can be varied over a wide range by way of an electrical control voltage. With this control voltage having a relatively low magnitude, the inverter is triggered into oscillation quite early in the period of each pulse of the DC supply voltage; whereas, with this control voltage having a relatively large magnitude, no inverter triggering takes place at all.

For in-between magnitudes of the control voltage, inverter triggering takes place at substantially corresponding in-between delays relative to the onset of each DC pulse; which means that the net effective RMS magnitude of the output voltage can be adjusted by adjusting the magnitude of the control voltage.

Thus, by providing a control voltage to a pair of control terminals, the magnitude of the inverter output voltage can be adjusted over a wide range: from a maximum and all the way down to zero output—with a response time equal to half a cycle of the 60 Hz power line voltage.

By sensing the average or RMS magnitude of the inverter output voltage and by providing a control voltage to the control transistor that is effectively proportional to that average or RMS magnitude, output magnitude control can be obtained.

DESCRIPTION OF THE PREFERRED EMBODIMENT

Description of the Drawings

Figure 1:
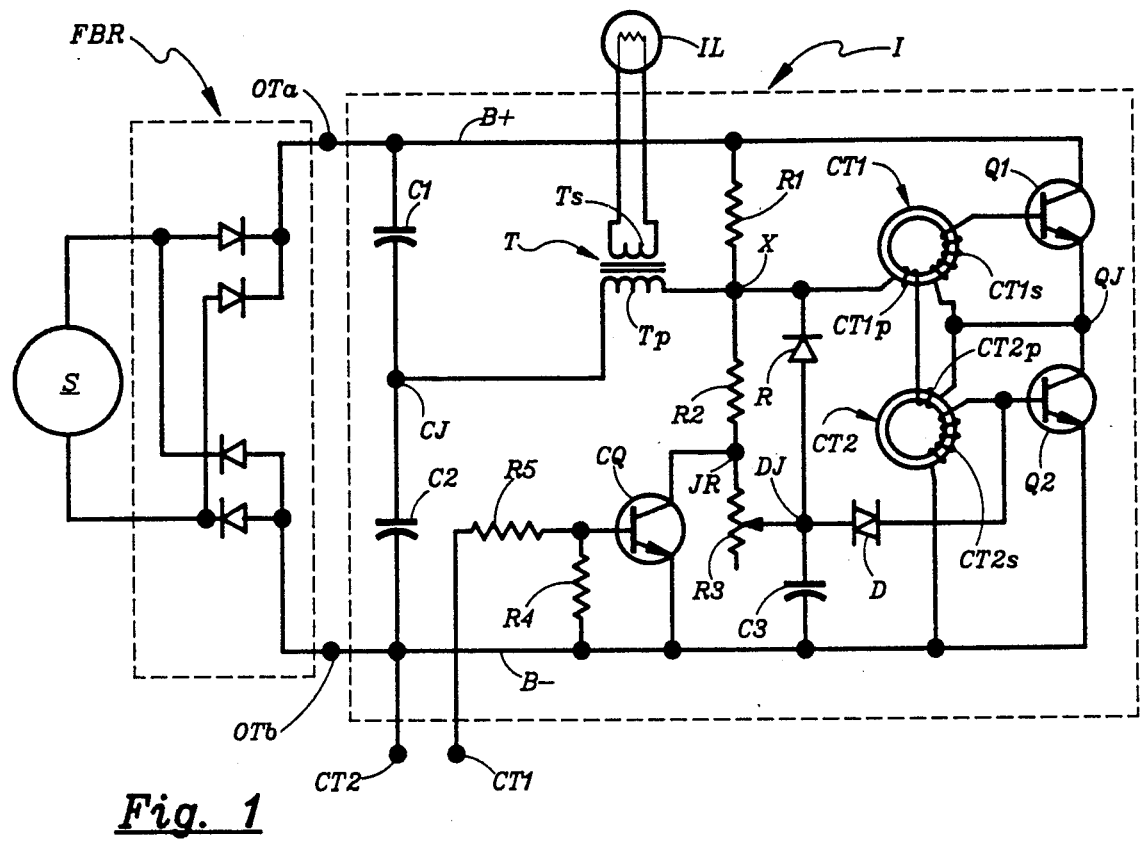
FIG. 1 schematically illustrates the preferred embodiment of the invention, showing an inverter-type power supply adapted to power a low-voltage incandescent lamp.

In FIG. 1, a source S of 120 Volt/60 Hz voltage is connected with full-bridge rectifier FBR. Positive output terminal OTa of rectifier FBR is connected directly with a B+ bus; and negative output terminal OTb of rectifier FBR is connected directly with a B— bus.

Between the B+ bus and the B— bus is connected a series-combination of two capacitors C1 and C2, which two capacitors are connected together at a junction CJ.

Between the B+ bus and the B— bus is also connected a series-combination of two transistors Q1 and Q2.

The secondary winding CT1s of positive feedback current transformer CT1 is connected directly between the base and the emitter of transistor Q1; and the secondary winding CT2s of positive feedback current transformer CT2 is connected directly between the base and the emitter of transistor Q2.

The collector of transistor Q1 is connected directly with the B+ bus; the emitter of transistor Q2 is connected directly with the B— bus; and the emitter of transistor Q1 is connected directly with the collector of transistor Q2, thereby forming junction QJ.

The series-connected primary windings CT1p and CT2p are connected directly between junction QJ and a point X; while the primary winding Tp of transformer T is connected between point X and junction CJ.

Transformer T has a secondary winding Ts, which is connected directly with an incandescent lamp IL.

A resistor R1 is connected with its one terminal to the B+ bus and with its other terminal to point X. Another resistor R2 is connected between point X and one terminal of a variable resistor R3. The other terminal of R3 is connected to junction DJ, to which junction is also connected one of the terminals of a capacitor C3. The other terminal of C3 is connected to the B— bus.

A Diac D is connected between junction DJ and the base of transistor Q2.

A rectifier R is connected with its anode to junction DJ and with its cathode to junction QJ.

A control transistor CQ is connected with its collector to the junction JR between resistors R2 and R3, and with its emitter to the B— bus. A resistor R4 is connected between the control transistor's base and emitter; and a resistor R5 is connected between a control terminal CT1 and the base of the control transistor. Another control terminal CT2 is connected directly with the B— bus.

The overall inverter is identifed with the letter I.

Actual values and descriptions of the components used in the preferred arrangement in FIG. 1 are listed as follows.

| | |
|---|---|
| Output of Source S: | 120 Volt/60 Hz; |
| Full Bridge Rectifier FBR: | Four 1N4004's; |
| Capacitors C1 & C2: | 0.47 μF/200 Volt; |
| Transistors Q1 & Q2: | Motorola MJE13002's; |
| Transistor CQ: | Motorola MXT3904; |
| Resistor R1: | 33 kOhm/0.25 Watt; |
| Resistor R2: | 100 kOhm/0.25 Watt; |
| Adjustable Resistor R3: | 1.5 MegOhm Potentiometer; |
| Resistor R4: | 22 kOhm/0.25 Watt; |
| Resistor R5: | 47 kOhm/0.25 Watt; |
| Capacitor C3: | 22 nF/50 Volt; |
| Rectifier R: | 1N4004; |
| Diac D: | General Electric ST-2; |
| Transformers CT1 & CT2: | Wound on Ferroxcube Toroids 213T050 of 3E2A Ferrite Material with two turns of #27 wire for the primary windings and ten turns of #31 wire for the secondary windings; |
| Transformer T: | Wound on a Ferroxcube 2616 Pot Core of 3C8 Ferrite Material with 95 turns of #27 wire for the primary winding and 20 turns of five twisted strands of #27 wire for the secondary winding; |
| Incandescent Lamp IL: | 12 Volt/25 Watt. |

The frequency of inverter oscillation associated with the component values identified above is approximately 30 kHz.

In FIG. 2a, the waveform identified as Wa represents the voltage Vi present between the B— bus and the B+ bus as plotted against time t. The magnitude of voltage Vi at the time t1 when the inverter is triggered into oscillation is indicated as Vi1. The magnitude of voltage Vi at the time t2 the inverter drops out of oscillation is indicated as Vi2.

In FIG. 2b, the waveform identified as Wb represents the inverter output voltage Vo plotted against time t; which output voltage exists across the secondary winding Ts of transformer T in FIG. 1, and which is the voltage provided to incandescent lamp IL.

Figure 3:
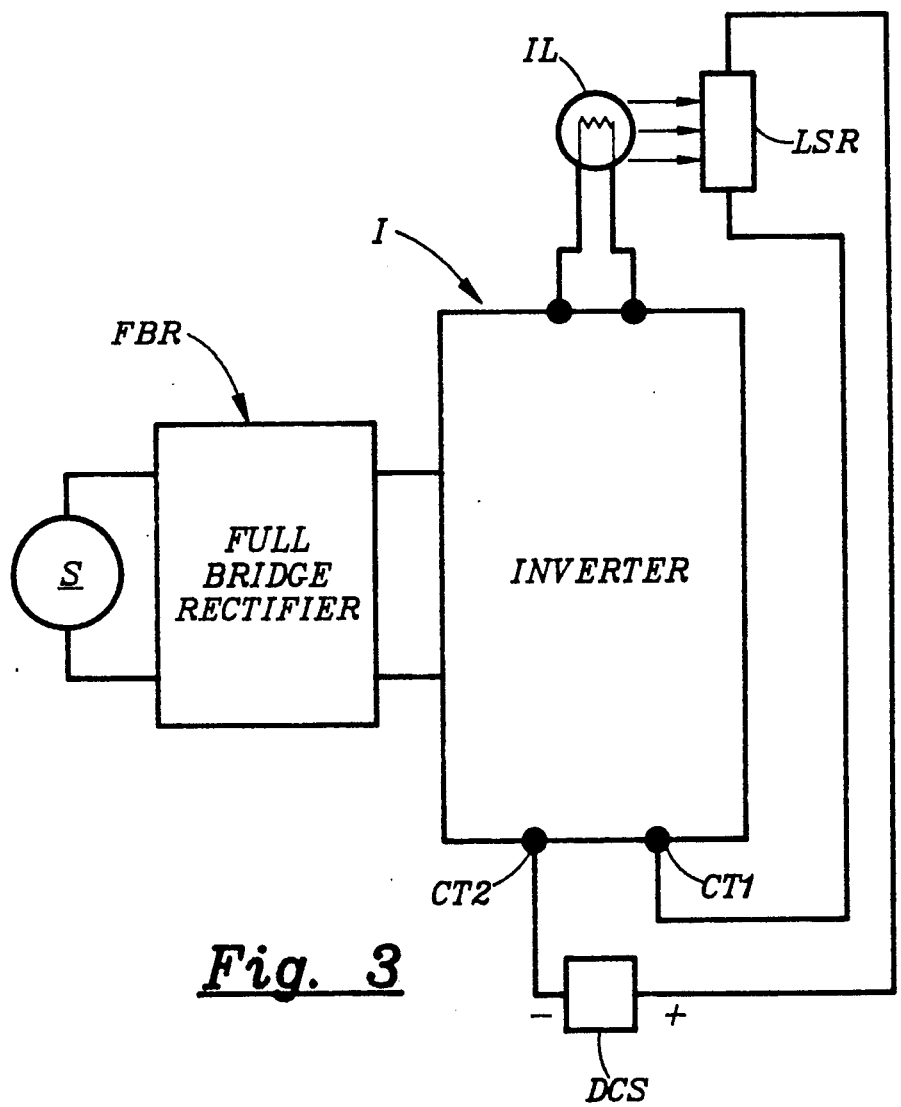
FIG. 3 illustrates the circuit of FIG. 1 arranged with feedback means operative to automatically control the RMS magnitude of the inverter output voltage.

FIG. 3 illustrates one particular use of the controllable inverter power supply of FIG. 1. In particular, the circuit arrangement of FIG. 3 is identical with that of FIG. 1 except for having added an automatic feedback control arrangement by way of having placed a light sensitive resistor LSR, such as a selenium semiconductor means, in the proximity of lamp IL and such as to be exposed to part of the light emitted from IL. The light sensitive resistor LSR is connected between the positive terminal of a DC source DCS and control terminal CT1. The negative terminal of DCS is connected directly with control terminal CT2.

Description of Operation

The operation of the circuit arrangement of FIG. 1 is described as follows.

Source S represents an ordinary 120 Volt/60 Hz electric utility power line, the voltage from which is rectified in full-wave fashion by full-bridge rectifier means FBR. Thus, in the absence of filtering means, the voltage present across output terminals OTa and OTb is substantially as depicted in FIG. 2a; which voltage is applied directly to the inverter circuit I.

This inverter circuit, which consists of the two series-connected switching transistors Q1 and Q2 in combination with the two positive feedback transformers CT1 and CT2, represents a self-oscillating half-bridge inverter and operates in a manner that is analogous with circuits previously described in published literature, as for instance in U.S. Pat. No. 4,184,128 entitled High Efficiency Push-Pull Inverters.

Since the DC voltage-supply feeding the inverter has no filtering capacitors, it is necessary to provide within the inverter a low impedance return path for the inverter current. Such a low impedance return path is provided by way of the two series-connected capacitors C1 and C2. However, it is necessary that the capacitance values of these capacitors be kept small enough not to represent significant energy-storing capacity in comparison to the amount of energy being drawn by the inverter over a half-cycle of the power line voltage. In this case, with the power drawn being about 25 Watt (which is about 208 milli-Joule per half-cycle of the 60 Hz power line voltage) the energy stored by the two series-connected 0.47 uF capacitors is indeed small in comparison (being only 2.6 milli-Joule at 150 Volt).

In the inverter circuit of FIG. 1, the bases of the transistors are—in terms of DC—shorted to their emitters; which implies that the inverter can not start oscillating by itself. However, by providing but a single brief pulse to the base of transistor Q2, this transistor is caused to conduct momentarily; which momentary conduction puts this one transistor into an amplifying situation; which is enough to trigger the inverter into oscillation—provided, of course, that there is adequate voltage present between the B− bus and the B+ bus.

Once triggered into oscillation, the inverter will continue to oscillate until the voltage between the B− bus and the B+ bus falls to such a low level as to be inadequate for sustaining regenerative feedback. At this point, which is identified as Vi2 in FIG. 2a, oscillations cease.

Inverter triggering is accomplished by way of a Diac; which Diac itself is triggered by the voltage on capacitor C3.

The output of the half-bridge inverter circuit is a substantially squarewave 30 kHz AC voltage, which output is provided between point X and junction CJ, and across which output is connected the primary winding of transformer T. The peak-to-peak amplitude of this 30 kHz squarewave voltage is substantially equal to the magnitude of the DC voltage present between the B− bus and the B+ bus; and therefore, as the magnitude of this DC voltage varies, so does the amplitude of the 30 kHz squarewave output voltage.

The incandescent lamp IL is connected directly across the secondary winding Ts of transformer T; which means that the voltage presented to the incandescent lamp is directly proportional to the inverter circuit output voltage.

Being supplied with a pulsed DC voltage similar to that depicted in FIG. 2a, the inverter circuit—even if oscillating at some given moment—will cease oscillating when the DC supply voltage falls below a certain minimal level (Vi2 in FIG. 2a). Thus, if the inverter is triggered into oscillation at some time during each of the unidirectional sinusoidally-shaped voltage pulses constituting the DC supply voltage, it will cease to oscillate at or near the end of each of these pulses.

In other words, the inverter circuit of FIG. 1 behaves much like a Triac or a thyristor: it can be triggered ON, and will remain ON until the end of the power-cycle—that is, until current flowing to the load falls below a certain threshold level. And, just like a thyristor, it can be triggered at substantially any point within the power-cycle; which means that it can be phase-controlled in a manner analogous to that of a thyristor.

Figure 2:
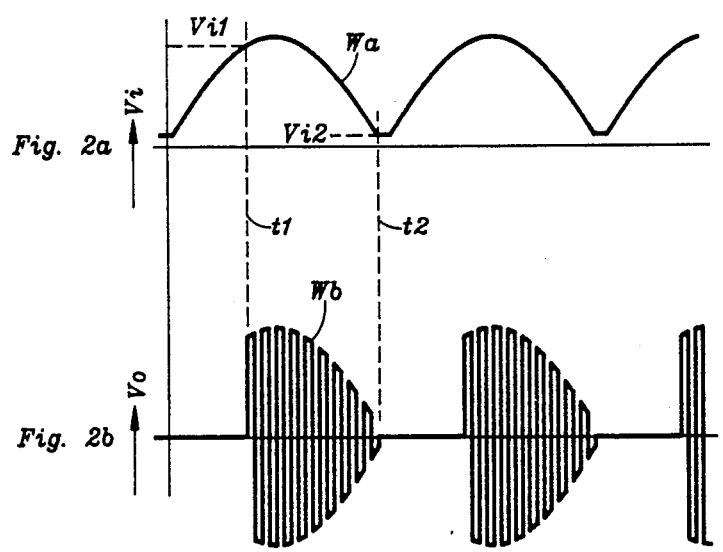
FIG. 2a illustrates the waveform of the DC supply voltage used for powering the inverter.
FIG. 2b illustrates the waveform of the inverter's squarewave output voltage.

In yet other words, the RMS or average magnitude of the voltage provided to the incandescent lamp can be controlled over a wide range simply by controlling the timing of the inverter trigger point (t1 in FIG. 2).

Triggering of the inverter circuit is accomplished essentially the same way as is the triggering of a Triac, and phase control is accomplished in the same manner.

In FIG. 1, resistors R2 and R3 in combination constitute a resistance means through which capacitor C3 is charged. By adjusting the magnitude of the combined resistance, the time to charge capacitor C3 is similarly adjusted; which implies that the phase-point (i.e., t1 in FIG. 2a) at which the inverter is triggered into oscillation is correspondingly adjusted.

The purpose of rectifier R is that of making sure that capacitor C3 gets fully discharged after the inverter is triggered into oscillation; which implies that this capacitor will start each new power cycle in a fully discharged condition, thereby assuring time-consistent triggering.

The reason for having R2 as a resistor physically separate from R3 is that of preventing the voltage at point X from being applied directly to capacitor C3, which could provide for a situation of actually preventing triggering from taking place.

The purpose of resistor R1, the resistance value of which is quite small in comparison with that of R2 and R3 combined, is that of making sure that there is enough voltage at junction CJ (relative to the B− bus) to permit the inverter circuit to be triggered into oscillation.

The function of control transistor CQ is that of providing for an electrically actuatable means by which the triggering of Diac D can be controlled. When there is no control voltage provided between control terminals CT1 and CT2, transistor CQ is non-conducting, and the trigger circuit (which consists of resistors R2 and R3, capacitor C3 and Diac D) will operate as if CQ is non-present. However, as an increasing positive voltage is provided to control terminal CT1, CQ will eventually start to conduct and thereby to shunt charging current away from capacitor C3. The more positive current that is provided into the base of CQ, the more charging current is shunted away from C3. Eventually, with a relatively high positive voltage provided at control terminal CT1, CQ gets so much base current that its shunting effect entirely prevents C3 to charge to a voltage high enough to provide triggering pulses.

Thus, by providing a unidirectional control voltage between control terminals CT1 and CT2—with the positive terminal of the control voltage being connected with CT1—electrically actuatable inverter trigger control results; which implies that the 30 kHz inverter output voltage can be electrically switched ON and/or OFF, as well as continuously controlled in terms of magnitude.

The arrangement of FIG. 3 demonstrates one way in which the control capability of the circuit of FIG. 1 can be put to use. The light output of lamp IL affects inverter triggering in such a way that increased light output will cause reduction in the RMS magnitude of the 30 kHz voltage output; which implies that—since light output is proportional to the RMS magnitude of the lamp voltage—the RMS magnitude of the lamp voltage will tend to remain constant even if the RMS magnitude of the power line voltage might change.

Another application in which the power supply of FIG. 1 can advantageously be used is as an electrically controllable source of power for the magnetron in a microwave oven—i.e., where the load would be a magnetron and not an incandescent lamp. In such an application, it would be desirable to have an electronic programming means be able to control the amount of power supplied to the microwave magnetron; which, of course, can be readily accomplished by way of having this programming means provide appropriate control voltages to control terminals CT1 and CT2.

Otherwise, the following comments are offered.

(a) The concept of feeding an inverter with a pulsed DC voltage and to have its oscillations phase controlled (in relationship to the phasing of the DC pulses) is not limited to be used with a half-bridge inverter circuit. Most any type of self-oscillating inverter circuit may be used, the chief criterion being that the inverter circuit must be of such a nature as to have to be triggered into oscillation.

(b) To achieve a reasonably wide range of control of RMS output voltage, it is important that the inverter be capable of sustained self-oscillation even at relatively low levels of DC supply voltage. In the circuit of FIG. 1, stable inverter self-oscillation is sustained down to a DC supply voltage of about 20 Volt; below which voltage oscillations abruptly cease.

It is believed that the present invention and its several attendant advantages and features will be understood from the preceeding description. However, without departing from the spirit of the invention, changes may be made in its form and in the construction and interrelationships of its component parts, the form herein presented merely representing the preferred embodiment.

I claim:

1. An arrangement comprising:
    a power line providing a power line voltage at a pair of power line terminals;
    an incandescent lamp having a pair of lamp terminals; and
    means connected in circuit between the power line terminals and the lamp terminals; the means being functional to provide a lamp voltage to the lamp terminals; the lamp voltage consisting of periodic bursts of high frequency voltage; the fundamental frequency of the high frequency voltage being substantially higher than that of the power line voltage; the periodic bursts of high frequency voltage being separated with intervals of zero voltage; each interval of zero voltage having a duration substantially longer than that of a complete cycle of the high frequency voltage.

2. The arrangement of claim 1 wherein: (i) the power line voltage has cycles; and (ii) the bursts of high frequency voltage occur in synchrony with the cycles of the power line voltage.

3. The arrangement of claim 1 wherein: (i) each periodic burst of the high frequency voltage has a period; and (ii) the peak-to-peak magnitude of the high frequency voltage is caused to vary by a substantial degree during this period.

4. The arrangement of claim 1 wherein, during each periodic burst, the peak-to-peak magnitude of the high frequency voltage is proportional to the instantaneous absolute magnitude of the power line voltage.

5. The arrangement of claim 1 wherein, during each periodic burst, the instantaneous absolute magnitude of the high frequency voltage is proportional to that of the power line voltage.

6. The arrangement of claim 1 wherein said means includes means for controlling the duration of each interval of zero voltage.

7. The arrangement of claim 1 wherein: (i) the power line voltage has a fundamental frequency on the order of 60 Hz; and (ii) the high frequency voltage has a fundamental frequency on the order of 30 kHz.

8. A combination comprising:
    a power line providing a power line voltage at a pair of power line terminals; the power line voltage having a first fundamental frequency;
    an incandescent lamp having a pair of lamp terminals; and
    frequency-converting voltage conditioning means connected in circuit between the power line terminals and the lamp terminals; the frequency-converting voltage conditioning means being functional to provide a lamp voltage to the lamp terminals; the lamp voltage consisting of periodic bursts of high frequency voltage; the periodic bursts occurring at a rate equal to twice the first fundamental frequency; the high frequency voltage having a second fundamental frequency; the second fundamental frequency being substantially higher than the first fundamental frequency; the periodic bursts of high frequency voltage being separated with intervals of zero magnitude voltage; each interval of zero magnitude voltage having a duration substantially longer than that of a complete cycle of the high frequency voltage.

9. The combination of claim 8 wherein said frequency-converting voltage conditioning means includes adjustment means operative to permit adjustment of said duration, thereby to permit adjustment of the RMS magnitude of the lamp voltage.

10. The combination of claim 8 wherein the frequency-converting voltage conditioning means includes transformer means operative to provide galvanic isolation between the lamp terminals and the power line terminals, thereby to prevent any substantial amount of current from flowing between the power line terminals and the lamp terminals by way of the frequency-converting voltage conditioning means.

11. A combination comprising:
    a source providing 60 Hz voltage at a pair of power line terminals;
    an incandescent lamp having lamp terminals; and
    means connected between the power line terminals and the lamp terminals; the means providing periodic bursts of 30 kHz voltage to the lamp terminals; the bursts of 30 kHz voltage being separated with intervals of zero magnitude voltage; each interval of zero magnitude voltage having a duration longer than that of a complete cycle of the 30 kHz voltage; the intervals of zero magnitude voltage occurring at a rate of 120 Hz.

12. The combination of claim 11 wherein, during each burst, the peak magnitude of the 30 kHz voltage varies substantially in proportion to the instantaneous absolute magnitude of the 60 Hz voltage.

13. The combination of claim 11 wherein said means includes a feature whereby said duration may be adjusted.

14. The combination of claim 11 wherein said means includes:
    rectifier means connected with the power line terminals and operative to provide a DC voltage at a set of DC terminals; the DC voltage having an instantaneous absolute magnitude that is, at least during a part of each cycle of the 60 Hz voltage, substantially equal to the instantaneous absolute magnitude of the 60 Hz voltage;
    inverter means connected with the DC terminals and operative, at least during a part of each cycle of the 60 Hz voltage, to provide a substantially squarewave voltage at a pair of inverter terminals; the instantaneous absolute magnitude of the square-wave voltage being, at least during a part of each cycle of the 60 Hz voltage, substantially proportional to the instantaneous absolute magnitude of the 60 Hz voltage; and transformer means connected between the inverter terminals and the lamp terminals; thereby to provide to the lamp terminals a substantially square-wave voltage having, at least during a part of each cycle of the 60 Hz voltage, an instantaneous absolute magnitude that is proportional to the instantaneous absolute magnitude of the 60 Hz voltage.

15. The combination of claim 11 wherein, during each burst, the absolute instantaneous magnitude of the voltage provided to the lamp terminals equals a substantially constant fraction of the instantaneous absolute magnitude of the 60 Hz voltage.

16. The combination of claim 11 wherein, during each burst, the RMS magnitude of the voltage provided to the lamp terminals equals a substantially constant fraction of the instantaneous absolute magnitude of the 60 Hz voltage; the RMS magnitude being computed over the duration of a complete half-cycle of the 30 kHz voltage.

* * * * *

(12) EX PARTE REEXAMINATION CERTIFICATE (6085th)
United States Patent
Nilssen

(10) Number: US 5,036,253 C1
(45) Certificate Issued: Jan. 8, 2008

(54) INVERTER POWER SUPPLY FOR INCANDESCENT LAMP

(76) Inventor: Ole K. Nilssen, Caesar Dr., Barrington, IL (US) 60010

Reexamination Request:
No. 90/007,668, Aug. 16, 2005

Reexamination Certificate for:
Patent No.: 5,036,253
Issued: Jul. 30, 1991
Appl. No.: 07/461,653
Filed: Jan. 8, 1990

Related U.S. Application Data

(63) Continuation of application No. 06/667,691, filed on Nov. 2, 1984, now abandoned, which is a continuation-in-part of application No. 06/487,817, filed on Apr. 22, 1983, now Pat. No. 4,506,318.

(51) Int. Cl.
*H02M 7/5383* (2006.01)
*H05B 39/00* (2006.01)
*H05B 39/04* (2006.01)
*H05B 41/00* (2006.01)

(52) U.S. Cl. .................. 315/151; 315/194; 315/224; 315/225; 315/362

(58) Field of Classification Search .................. None
See application file for complete search history.

(56) References Cited

U.S. PATENT DOCUMENTS

| | | | |
|---|---|---|---|
| 4,104,715 A | 8/1978 | Lawson | |
| 4,164,014 A | 8/1979 | Crowe | |
| 4,233,545 A | 11/1980 | Webster | |
| 4,414,617 A | 11/1983 | Galindo | |
| 4,502,107 A | 2/1985 | Nilssen | |
| 4,506,318 A | * 3/1985 | Nilssen | 363/132 |
| 4,591,764 A | 5/1986 | Nilssen | |
| 5,083,255 A | * 1/1992 | Nilssen | 363/132 |

OTHER PUBLICATIONS

General Electric Controlled Rectifier Manual, First Ed. (1960), Chap. 7, pp. 82–105; Chap. 8, pp. 106–143.

Motorola Application Note AN–199, "A Solid–State 15KHz Power Inverter," Jack Takesuye (1967).

Motorola Application Note AN–222, "The ABC's of DC to AC Inverters," rev. by Robert Haver (1972).

Motorola Semiconductor Power Circuits Handbook, First Edition (1968), Chap 1 pp. 1–18–1–23 and Chap. 2 pp. 2–1–2–65.

* cited by examiner

*Primary Examiner*—James Menefee

(57) ABSTRACT

An inverter is powered by a magnitude-modulated DC supply voltage derived by rectification from an ordinary 120Volt/60Hz electric utility power line. The inverter powers a low voltage (12 Volt) incandescent lamp with a magnitude-modulated high frequency (30 kHz) voltage. The magnitude modulation on the high frequency voltage is proportional to the magnitude modulation on the DC supply voltage.

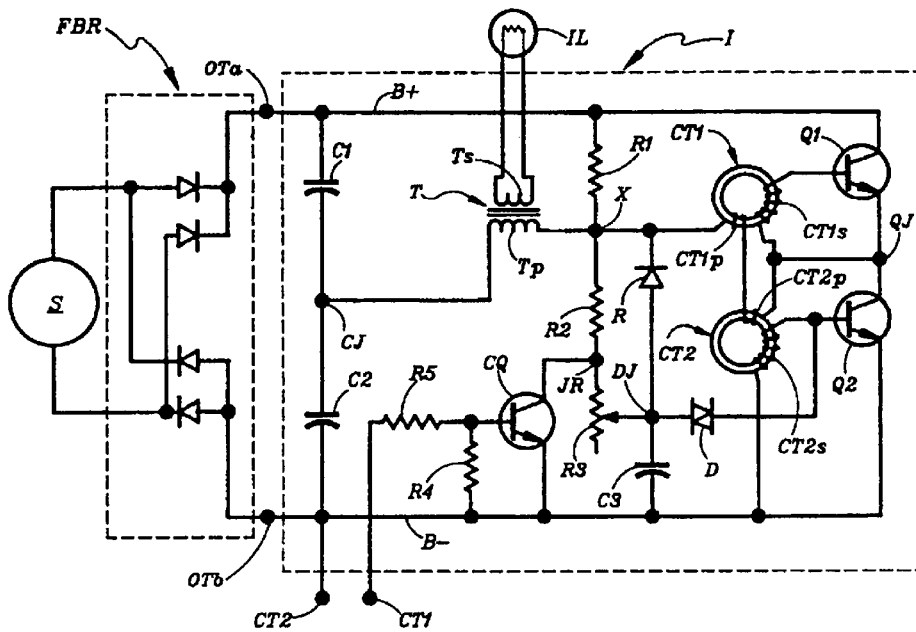

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–16 are cancelled.

* * * * *